US009601107B2

(12) United States Patent
Okamoto (10) Patent No.: US 9,601,107 B2
(45) Date of Patent: Mar. 21, 2017

(54) SPEECH RECOGNITION SYSTEM, RECOGNITION DICTIONARY REGISTRATION SYSTEM, AND ACOUSTIC MODEL IDENTIFIER SERIES GENERATION APPARATUS

(75) Inventor: Akihiro Okamoto, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 90 days.

(21) Appl. No.: 14/126,567

(22) PCT Filed: Aug. 9, 2012

(86) PCT No.: PCT/JP2012/005073
§ 371 (c)(1),
(2), (4) Date: Dec. 16, 2013

(87) PCT Pub. No.: WO2013/027360
PCT Pub. Date: Feb. 28, 2013

(65) Prior Publication Data
US 2014/0129222 A1 May 8, 2014

(30) Foreign Application Priority Data

Aug. 19, 2011 (JP) ................................. 2011-179966

(51) Int. Cl.
*G10L 15/187* (2013.01)
*G10L 15/22* (2006.01)
(Continued)

(52) U.S. Cl.
CPC .............. *G10L 15/06* (2013.01); *G10L 15/02* (2013.01); *G10L 15/30* (2013.01)

(58) Field of Classification Search
USPC ....................................................... 704/243
See application file for complete search history.

(56) References Cited

U.S. PATENT DOCUMENTS 7,809,562 B2* 10/2010 Hanazawa .............. G10L 15/32
704/10
2002/0065656 A1* 5/2002 Reding ................... G10L 15/30
704/244

(Continued)

FOREIGN PATENT DOCUMENTS

JP 63-153596 A 6/1988
JP 2004-012653 A 1/2004

(Continued)

OTHER PUBLICATIONS

International Preliminary Report on Patentability dated Mar. 6, 2014, for the corresponding International application No. PCT/JP2012/005073.

(Continued)

*Primary Examiner* — David Hudspeth
*Assistant Examiner* — Shreyans Patel
(74) *Attorney, Agent, or Firm* — Morgan, Lewis & Bockius LLP (57) ABSTRACT

When it is determined that sound data is unrecognizable through a speech recognition process by a first speech recognition unit (3), the same sound data as the sound data inputted to the first speech recognition unit (3) is transmitted to a second server device (60) and a first server device (70). Recognition data is generated which is formed of a character string that is a speech recognition result by the second server device (60) with respect to the sound data, and an acoustic model identifier series generated by a first acoustic model identifier series generation unit (27) of the first server (70) based on the sound data, and the generated recognition data is registered in a first recognition dictionary (3b) of the first speech recognition unit (3).

11 Claims, 2 Drawing Sheets

(51) Int. Cl.
*G10L 15/06* (2013.01)
*G10L 15/02* (2006.01)
*G10L 15/30* (2013.01)

(56) References Cited

U.S. PATENT DOCUMENTS

2007/0276651 A1   11/2007  Bliss et al.
2008/0300871 A1*  12/2008  Gilbert .................... G10L 15/20
                                                              704/233
2009/0204392 A1    8/2009  Ishikawa
2009/0254341 A1*  10/2009  Yamamoto .............. G10L 25/78
                                                              704/233

FOREIGN PATENT DOCUMENTS

JP         2007-33901 A    2/2007
JP         2012-088370 A   5/2012
WO      2008/007688 A1  1/2008

OTHER PUBLICATIONS

European Search Report dated Apr. 17, 2015 for corresponding European Patent Application No. 12825178.2.

Dong Yu et al., Unsupervised Learning from Users' Error Correction in Speech Dictation, Proceedings of the International Conference on Spoken Language Proceeding, Oct. 4, 2004, pp. 1-4, XP-002325530.

* cited by examiner

SPEECH RECOGNITION SYSTEM, RECOGNITION DICTIONARY REGISTRATION SYSTEM, AND ACOUSTIC MODEL IDENTIFIER SERIES GENERATION APPARATUS

TECHNICAL FIELD

The present invention relates to a speech recognition system that takes as input a command or the like via a speech, a recognition dictionary registration system that automatically performs additional registration of recognition data for a recognition dictionary used in the speech recognition system, and an acoustic model identifier series generation apparatus that automatically generates an acoustic model identifier series which composes the recognition data.

BACKGROUND ART

Conventionally, a terminal or the like has been proposed, which has a speech recognition function of taking as input a command via a speech.

In order to improve the accuracy of the speech recognition function in such a terminal, relatively large-scale hardware is required. Conversely, in the case of a portable terminal or the like, hardware to be built therein is limited. Hence, in a portable terminal or the like, there is a possibility that a speech recognition function having a required accuracy is unrealizable.

In order to avoid this technical problem, Patent Document 1 discloses the following speech recognition system. The speech recognition system disclosed in Patent Document 1 is a speech recognition system that includes a server and a client.

According to this speech recognition system, first, a primary speech recognition is performed on sound data obtained by the client (portable terminal) using a first recognition dictionary. When the speech cannot be recognized by the primary speech recognition, the client transmits the sound data to the server.

Subsequently, the server performs a secondary speech recognition on the sound data using a second recognition dictionary having stored therein a larger number of vocabularies than the first recognition dictionary. In addition, the server generates recognition data to be registered in the first recognition dictionary, and transmits the recognition data to the client. The client registers the received recognition data in the first recognition dictionary.

By using the above-explained speech recognition system, a speech recognition function having a required accuracy can be realized. Moreover, since only recognition data that is frequently used is added to hardware, even in a case of a device with a hardware limitation such as a portable terminal, a recognition dictionary having a high recognition accuracy can be generated.

PRIOR ART DOCUMENTS

Patent Documents

Patent Document 1: JP 2004-12653 A

SUMMARY OF THE INVENTION

Problems to be Solved

Speech recognition is generally performed by extracting a certain feature from obtained sound data, and calculating the probability of each piece of recognition data which is contained in the recognition dictionary by using the feature. Hence, it is necessary that the recognition data contained in the recognition dictionary be data that corresponds to the feature to be extracted.

In the speech recognition system disclosed in Patent Document 1, since the type of feature utilized in the recognition data on the server side is identical to the type of feature utilized in the recognition data on the client side, the recognition data generated by the server can be registered in the recognition dictionary of the client. Moreover, the client can perform speech recognition using the recognition dictionary in which the recognition data is additionally registered.

When, however, the type of feature utilized in the server and the type of feature utilized in the client are different, even if the recognition data generated by the server is registered in the recognition dictionary of the client, the newly added recognition data is unavailable to in the client.

Hence, it is necessary to take measures such as controlling the server so as to generate recognition data corresponding to the feature used by the client. When, however, the server that performs the secondary speech recognition is not under the control of a system constructor of the client, it is difficult to match the type of feature utilized in the server with the type of feature utilized in the client, and to allow the server to generate speech recognition data available for the client.

Therefore, the present invention has been made in view of the conventional unaddressed problems, and it is an object of the present invention to provide a speech recognition system and a recognition dictionary registration system that are capable of additionally registering recognition data utilizing a result of a speech recognition in a recognition dictionary of a speech recognition device on the client side, even when the result is obtained through performing a speech recognition by using the speech recognition device that is not under the control of a system constructor, and an acoustic model identifier series generation apparatus that automatically generates an acoustic model identifier series that composes the recognition data.

Advantageous Effects of the Invention

According to an aspect of the present invention, there is provided a speech recognition system including: a first speech recognition device; a second speech recognition device; and an acoustic model identifier series generation apparatus. The first speech recognition device includes: a sound input unit configured to obtain sound and to output sound data of the obtained sound; a first recognition dictionary configured to store recognition data formed of a combination of information on a character string, and an acoustic model identifier series based on a first type of feature corresponding to the information on the character string; a first speech recognition processing unit configured to extract the first type of feature from a piece of the sound data outputted by the sound input unit, and to perform a speech recognition process on the piece of sound data using the first type of feature and the first recognition dictionary; and a recognition data registration unit. The second speech recognition device includes: a second recognition dictionary configured to store recognition data formed of a combination of information on a character string, and an acoustic model identifier series based on a second type of feature corresponding to the information on the character string and different from the first type of feature; and a second speech recognition processing unit configured to extract the second type of feature from the piece of sound data, and to perform a speech recognition process on the piece of sound data using the second type of feature and the second recognition dictionary, and to transmit information on a character string corresponding to the piece of sound data to an outside. The acoustic model identifier series generation apparatus includes an acoustic model identifier series generation unit configured to extract the first type of feature from the piece of sound data, and to generate an acoustic model identifier series based on the first type of feature corresponding to the piece of sound data, and to transmit the acoustic model identifier series. The recognition data registration unit of the first speech recognition device: receives the acoustic model identifier series based on the first type of feature corresponding to the piece of sound data transmitted by the acoustic model identifier series generation unit, and the information on the character string corresponding to the piece of sound data transmitted by the second speech recognition processing unit, and registers, in the first recognition dictionary, the recognition data be stored in the first recognition dictionary, the recognition data being formed of a combination of the received acoustic model identifier series based on the first type of features and the information on the character string.

In the above configuration, the speech recognition system may further include a noise data storing unit configured to store noise data. The acoustic model identifier series generation unit may extract the first type of feature from second sound data obtained by superimposing the noise data on the piece of sound data, and generate the acoustic model identifier series based on the first type of feature corresponding to the piece of sound data from the extracted first type of feature.

The acoustic model identifier series generation unit may superimpose the noise data on the piece of sound data such that a ratio of an energy of sound uttered by a human and an energy of noise contained in the second sound data becomes a preset ratio.

When it is determined that the piece of sound data is unrecognizable through the speech recognition process by the first speech recognition processing unit, the second speech recognition processing unit may perform the speech recognition process on the piece of sound data determined as unrecognizable by the first speech recognition processing unit.

The second speech recognition processing unit may output a plurality of candidates for the information on the character string corresponding to the piece of sound data. The first speech recognition device may include a selecting unit configured to select one candidate among the plurality of candidates for the information on the character string corresponding to the piece of sound data outputted by the second speech recognition processing unit. The recognition data registration unit may generate the recognition data to be stored in the first recognition dictionary, and register the recognition data in the first recognition dictionary, the recognition data being formed of a combination of the acoustic model identifier series based on the first type of feature corresponding to the piece of sound data transmitted by the acoustic model identifier series generation unit, and the information on the character string corresponding to the piece of sound data transmitted from the second speech recognition unit and selected by the selecting unit.

The acoustic model identifier series generation apparatus may be loaded in a casing different from a casing of the first speech recognition device.

The acoustic model identifier series generation apparatus may be loaded in a server device capable of communicating with the first speech recognition device.

The acoustic model identifier series generation apparatus may be loaded in a same casing as the first speech recognition device.

The first speech recognition processing unit may loaded in a terminal device, and the second speech recognition processing unit may be loaded in a server device capable of communicating with the terminal device.

According to another aspect of the present invention, there is provided a recognition dictionary registration system including: a first speech recognition device; and an acoustic model identifier series generation apparatus. The first speech recognition device includes: a first recognition dictionary configured to store recognition data formed of a combination of information on a character string, and an acoustic model identifier series based on a first type of feature corresponding to the information on the character string; a first speech recognition processing unit configured to obtain a piece of sound data outputted by a sound input unit that obtains sound and outputs the sound data of the obtained sound, and to extract the first type of feature from the piece of the sound data, and to perform a speech recognition process on the piece of sound data using the first type of feature and the first recognition dictionary; and a recognition data registration unit. The acoustic model identifier series generation apparatus includes an acoustic model identifier series generation unit configured to extract the first type of feature from the piece of sound data, and to generate an acoustic model identifier series based on the first type of feature corresponding to the piece of sound data from the extracted first type of feature, and to transmit the acoustic model identifier series. The recognition data registration unit of the first speech recognition device registers, in the first recognition dictionary, the recognition data to be stored in the first recognition dictionary, the recognition data being formed of a combination of information on a character string corresponding to the piece of sound data outputted by a second speech recognition device and the acoustic model identifier series based on the first type of feature transmitted from the acoustic model identifier series generation apparatus. The second speech recognition device includes: a second recognition dictionary configured to store recognition data which is a combination of information on a character string and an acoustic model identifier series based on a second type of feature corresponding to the information on the character string and different from the first type of feature; and a second speech recognition processing unit configured to extract the second type of feature from the piece of sound data, and to perform a speech recognition process using the second type of feature and the second recognition dictionary, and to transmit the information on the character string corresponding to the piece of sound data to an outside.

According to another aspect of the present invention, there is provided an acoustic model identifier series generation apparatus including: an acoustic model identifier series generation unit configured to extract a first type of feature from sound data outputted by a sound input unit that obtains a sound, and to generate an acoustic model identifier series based on the first type of feature corresponding to the sound data, and to transmit the acoustic model identifier series. The acoustic model identifier series generation unit transmits the acoustic model identifier series to a recognition data registration unit of a first speech recognition device. The first speech recognition device includes: a first recognition dictionary configured to store recognition data which is formed of a combination of information on a character string and an acoustic model identifier series based on the first type of feature corresponding to the information on the character string; a first speech recognition processing unit configured to extract the first type of feature from the sound data, and to perform a speech recognition process on the sound data using the first type of feature and the first recognition dictionary; and the recognition data registration unit. The recognition data registration unit registers, in the first recognition dictionary, the recognition data to be stored in the first recognition dictionary, the recognition data being formed of a combination of information on a character string corresponding to the sound data outputted by a second speech recognition device and the acoustic model identifier series based on the first type of feature corresponding to the sound data transmitted by the acoustic model identifier series generation apparatus. The second speech recognition device includes: a second recognition dictionary configured to store recognition data which is formed of a combination of information on a character string and an acoustic model identifier series based on a second type of feature corresponding to the information on the character string and different from the first type of feature; and a second speech recognition processing unit configured to extract the second type of feature from the sound data, and to perform a speech recognition process using the second type of feature and the second recognition dictionary, and to transmit the information on the character string corresponding to the sound data to an outside.

According to the present invention, there are provided a speech recognition system and a recognition dictionary registration system that are capable of automatically additionally registering recognition data utilizing a result of a speech recognition in a recognition dictionary of a speech recognition device on the client side, the result being obtained through performing a speech recognition by using a speech recognition device that is not under the control of a system constructor, and an acoustic model identifier series generation apparatus that automatically generates an acoustic model identifier series that composes the recognition data.

DESCRIPTION OF EMBODIMENTS

An embodiment of the present invention will be explained below with reference to the accompanying drawings.

Figure 1:
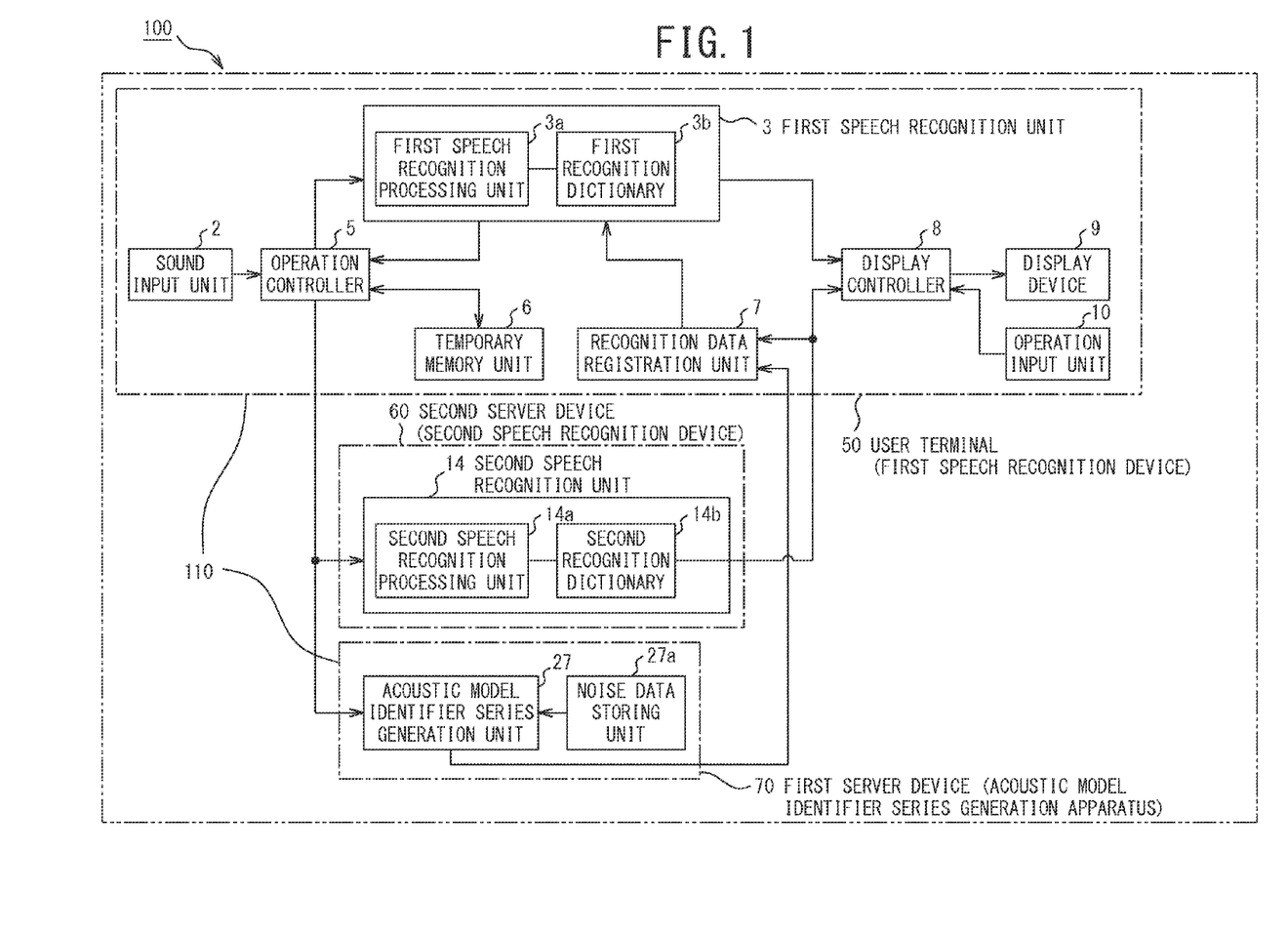
FIG. 1 is a schematic configuration diagram illustrating an example speech recognition system according to the present invention.

FIG. 1 is a schematic configuration diagram illustrating an example speech recognition system 100 as an embodiment of the present invention. This speech recognition system 100 configures a speech recognition system that includes a recognition dictionary registration system 110 and a second server device (second speech recognition device) 60.

This speech recognition system 100 includes a user terminal 50 (first speech recognition device), a first server device (acoustic model identifier series generation apparatus) 70, and a second server device (second speech recognition device) 60. The user terminal 50 is capable of communicating with each of the first server device 70 and the second server device 60 in a wired or wireless manner.

The recognition dictionary registration system 110 employs a configuration having the speech recognition system 100 from which the second server device (second speech recognition device) 60 is omitted, and includes the user terminal (first speech recognition device) 50 and the first server device (acoustic model identifier series generation apparatus) 70.

The user terminal 50 includes a sound input unit 2, a first speech recognition unit 3, an operation controller 5, a temporal memory unit 6, a recognition data registration unit 7, a display controller 8, a display device 9, and an operation input unit 10.

The sound input unit 2 includes a sound pick up device like a microphone. This sound input unit 2 converts an uttered sound into an analog electrical signal corresponding to the sound, converts this electrical signal into a digital signal through an unillustrated A/D converter, and outputs the converted digital signal to the operation controller 5 as sound data. The sound data is not limited to any particular one as long as the data represents sound.

The first speech recognition unit 3 includes a first speech recognition processing unit 3a and a first recognition dictionary 3b.

The first speech recognition processing unit 3a takes sound data as input from the sound input unit 2 via the operation controller 5, and performs a speech recognition on the sound data. The first speech recognition processing unit 3a extracts time-series data of feature (first type of feature) for a speech recognition from the sound data formed of digital signals. Furthermore, the first speech recognition processing unit 3a analyzes the time-series data of the feature and selects the most likely recognition data, by using an acoustic model identifier series of each piece of recognition data stored in the first recognition dictionary 3b and an acoustic model unit (a data group having a feature defined for each identifier) through the Viterbi algorithm. Next, a character string composing the selected recognition data is obtained as a character string to be a recognition result of the inputted sound data.

When the corresponding character string can be obtained from the first recognition dictionary 3b upon the speech recognition on the sound data, the first speech recognition processing unit 3a outputs a recognition success notification indicating that the speech recognition was successful to the operation controller 5, and further outputs the character string obtained by the speech recognition to the display controller 8 together with the recognition success notification. Conversely, when no corresponding character string was obtained from the first recognition dictionary 3b, the first speech recognition processing unit 3a outputs a recognition failure notification indicating that the speech recognition was unsuccessful to the operation controller 5 and the display controller 8.

In this case, the first recognition dictionary 3b stores, as recognition data, a character string and an acoustic model identifier series which is an acoustic model identifier series corresponding to that character string in association with each other.

The recognition data is registered in advance in the first recognition dictionary 3b through the following procedures. That is, when a user utters a speech to the sound input unit 2 in accordance with a character string to be registered, the sound data corresponding to the character string to be registered is obtained. A speech recognition process with the Viterbi algorithm to which a Hidden Markov Model is applied is performed on the sound data. Hence, a recognition dictionary storing in advance respective acoustic models of all phonetic symbols (e.g., Japanese syllabary) arranged in a parallel, the acoustic models being evaluated through an endless loop until the end of uttering, is used to obtain an acoustic model identifier series corresponding to the time-series data of the feature extracted from the inputted sound data. The obtained acoustic model identifier series is corresponded to the character string to be registered.

For example, an acoustic model series "a", "Ri", "Ga", and "To" is obtained from the sound data uttered by the user in accordance with a character "Thanks", and the obtained acoustic model series is converted into a corresponding acoustic model identifier series. In the present embodiment, for example, if it is assumed that an identifier corresponding to an acoustic model of "a" is "0-1", an identifier corresponding to an acoustic model of "Ri" is "13-9", an identifier corresponding to an acoustic model of "Ga" is "7-1", and an identifier corresponding to an acoustic model of "To" is "20-15", the acoustic model identifier series corresponding to the acoustic model series "a", "Ri", "Ga", and "To" is "0-1" "13-9" "7-1" and "20-15".

This acoustic model identifier series is associated with the output character string "Thanks" which is inputted through the operation input unit 10, and those are registered in the first recognition dictionary 3b as recognition data.

The first speech recognition processing unit 3a extracts time-series data of feature (first type of feature) from the inputted sound data, and obtains a character string corresponding to the time-series data of the feature from the first recognition dictionary 3b through a speech recognition process with the Viterbi algorithm to which the Hidden Markov Model is applied.

In this case, the first speech recognition processing unit 3a evaluates how much correlation is there between the time-series data of the time-sequential feature extracted from the sound data and the recognition data registered in the first recognition dictionary 3b based on the likelihood according to the Viterbi algorithm, and obtains a character string corresponding to the sound data from the recognition data having the likelihood equal to or greater than a threshold.

In this case, when no threshold is provided and the recognition data having the highest likelihood is simply always selected as the recognition result, even if the user utters a speech that is completely irrelevant from the vocabularies already registered in the recognition dictionary, any one piece of the recognition data having the highest likelihood and contained in the recognition dictionary is output. Thus, there is provided a configuration in which a threshold is provided to output only the recognition data having likelihood equal to or greater than the threshold and being correlated to some extent as the recognition result, and to output a recognition result indicating that no correlated recognition data is found, when the time-series data has no correlation. It is not always necessary to set a threshold. It is possible to output a recognition result indicating that no correlated recognition data is found by using dedicated recognition data (Garbage Model) for absorbing an utterance which is completely irrelevant and comparing the likelihood thereof with the likelihood of recognition data contained in the recognition dictionary.

The operation controller 5 takes sound data as input from the sound input unit 2, and performs an operation control process of allowing the second server device (second speech recognition device) 60 to execute a speech recognition process in accordance with the result of the speech recognition by the first speech recognition unit 3 on the sound data. The second server device 60 executes a unique speech recognition process independently of the speech recognition process by the first speech recognition unit 3, and outputs, as a speech recognition result, a character string corresponding to the inputted sound data.

Figure 2:
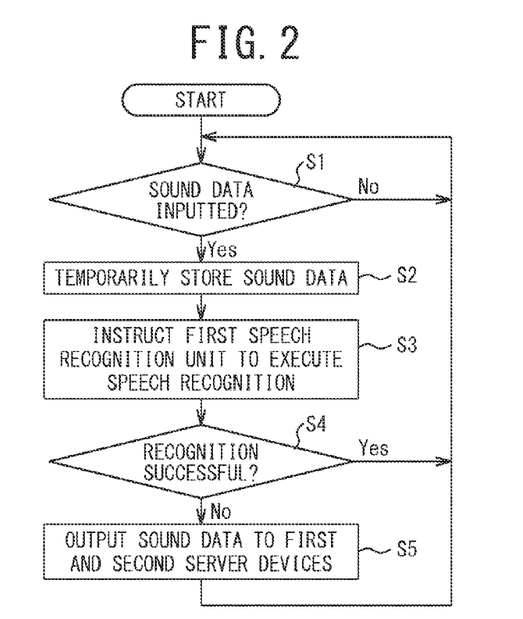
FIG. 2 is a flowchart illustrating an example flow of an operation control process.

More specifically, as illustrated in the flowchart of FIG. 2, first, the operation controller 5 determines in step S1 whether or not sound data is inputted from the sound input unit 2. When the sound data is inputted, the operation controller 5 stores the sound data in the temporal memory unit 6 (step S2). Moreover, the operation controller 5 instructs the first speech recognition unit 3 to execute a speech recognition, and outputs the sound data inputted from the sound input unit 2 to the first speech recognition unit 3 (step S3).

When the operation controller 5 takes a recognition failure notification as input from the first speech recognition unit 3 as the speech recognition result, the process progresses from step S4 to step S5, the operation controller 5 reads the sound data stored in the temporal memory unit 6, and outputs the read sound data to the first server device 70 and the second server device 60. That is, the operation controller 5 instructs the second server device 60 to execute a speech recognition on the same sound data as the sound data that the first speech recognition unit 3 was unable to perform a speech recognition.

Conversely, when a recognition success notification is inputted in step S4 from the first speech recognition unit 3 as the speech recognition result, since it is unnecessary for the second server device 60 to perform a speech recognition, the process directly returns to the step S1.

The recognition data registration unit 7 receives the acoustic model identifier series generated by the first server device 70, and receives the character string obtained as the result of the speech recognition by the second server device 60, and combines the acoustic model identifier series and the character string to generate recognition data, and registers the generated recognition data in the first recognition dictionary 3b.

The display controller 8 performs a display control process of outputting the speech recognition result by the first speech recognition unit 3 or the second server device 60 to the display device 9.

Figure 3:
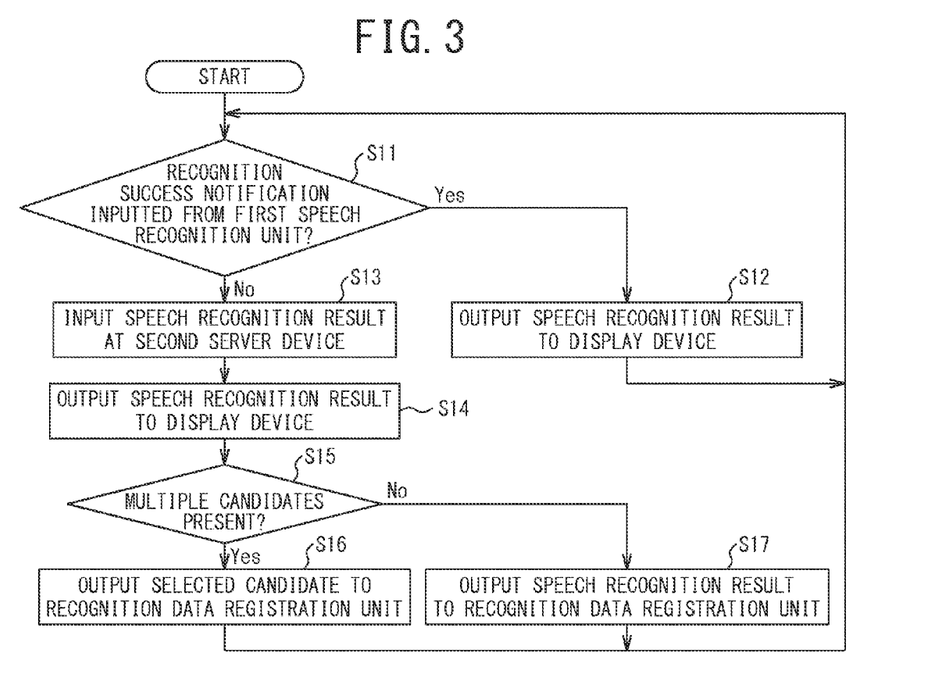
FIG. 3 is a flowchart illustrating an example flow of a display control process.

More specifically, as illustrated in FIG. 3, when the display controller 8 takes the recognition result as input from the first speech recognition unit 3, and takes as input a recognition success notification as the recognition result, the process progresses from step S11 to step S12, and the display controller 8 outputs a character string that is the speech recognition result inputted from the first speech recognition unit 3 to the display device 9 together with the recognition result.

Conversely, when the display controller 8 receives a recognition failure notification from the first speech recognition unit 3 as the recognition result, the process progresses to step S13, and the display controller 8 receives takes as input the speech recognition result by the second server device 60 from the second server device 60, and outputs to the display device 9 (step S14).

Subsequently, the process progresses to step S15. When multiple candidates are set as the speech recognition result by the second server device 60, the process progresses to step S16. The display controller 8 reads a candidate selected by the operation input unit 10 (selecting unit) among the multiple candidates displayed on the display device 9 and outputs this to the recognition data registration unit 7. After that, the process returns to the step S11. Moreover, when a cancel instruction is inputted through the operation input unit 10, the process directly returns to the step S11.

Conversely, when no multiple candidates are set as the speech recognition result by the second server device 60, i.e., when only one character string is inputted as the speech recognition result by the second server device 60, the process progresses to step S17. The user terminal 50 receives the speech recognition result by the second server device 60, and outputs the received speech recognition result to the recognition data registration unit 7, and, the process returns to the step S11.

Returning to FIG. 1, the second server device 60 includes a second speech recognition processing unit 14*a* and a second recognition dictionary 14*b*.

The second speech recognition processing unit 14*a* takes sound data picked up by the sound input unit 2 as input from the operation controller 5 of the user terminal 50, and performs a speech recognition on that sound data using the recognition data of the second recognition dictionary 14*b*. The second speech recognition processing unit 14*a* of the second server device 60 outputs one or a multiple candidates of the speech recognition result based on the extent (likelihood) that the inputted sound data and the recognition data are possibly correlated with each other.

The second speech recognition processing unit 14*a* outputs the one or multiple recognition result candidates obtained upon the speech recognition process to the user terminal 50.

The second recognition dictionary 14*b* stores, as recognition data, a character string and an acoustic model identifier series corresponding to the character string in association with each other. However, the correspondence between the acoustic model (the type and number of phonetic symbols of the acoustic model, the type and number of feature, and an analysis method thereof) may be different from that of the first recognition dictionary 3*b* of the first speech recognition unit 3.

That is, if it is assumed that an identifier corresponding to an acoustic model "a" in the first speech recognition unit 3 is "0-1", it is not always necessary that an identifier corresponding to an acoustic model "a" in the second server device (second speech recognition device) 60 be "0-1", and the unit of acoustic models be a mono-phoneme.

In addition, the processing method by the second speech recognition processing unit 14*a* may be different from the processing method by the first speech recognition processing unit 3*a*. That is, the first speech recognition processing unit 3*a* extracts the time-series data of the feature (first type of feature) for a speech recognition from the sound data, but the second speech recognition processing unit 14*a* does not need to extract the first type of feature from the sound data, but may extract a second type of feature (time-series data of feature) different from the first type of feature, and may process the second type of feature through an analysis method different from the Viterbi algorithm utilized by the first speech recognition processing unit 3*a*.

Furthermore, the second speech recognition may have any pattern matching method other than Viterbi algorithm to which the Hidden Markov model is applied.

In this manner, the second server device 60 merely has to perform a speech recognition on the obtained sound data, and outputs a character string which is the recognition result to the user terminal 50 which has transmitted the sound data, and the processing method is not limited to any particular one.

The first server device (acoustic model identifier series generation apparatus) 70 includes an acoustic model identifier series generation unit 27 and a noise data storing unit 27*a*.

The acoustic model identifier series generation unit 27 generates an acoustic model identifier series with the sound data in the first recognition dictionary 3*b* of the first speech recognition unit 3.

More specifically, when the acoustic model identifier series generation unit 27 takes the sound data as input from the user terminal 50, the acoustic model identifier series generation unit 27 performs a process of superimposing noise data on the inputted sound data.

To improve noise resistance, the acoustic model identifier series generation unit 27 superimposes noise data that is stored in advance in the noise data storing unit 27*a* on the inputted sound data to generate noise-superimposed sound data. At this time, the acoustic model identifier series generation unit 27 analyses an SN ratio of the inputted sound data, and superimposes the noise data on the sound data such that the SN ratio of the noise-superimposed sound data becomes a preset SN ratio.

Subsequently, the acoustic model identifier series generation unit 27 obtains time-series data of the same type of feature as the feature (the first type of feature) extracted by the first speech recognition processing unit 3*a* for the noise-superimposed sound data, and outputs an acoustic model identifier series obtained using the same type of acoustic model as the acoustic model stored in the first speech recognition processing unit 3*a*.

That is, by a speech recognition process with the Viterbi algorithm to which the Hidden Markov model is applied, an acoustic model identifier series corresponding to the time-series data of the feature extracted from the noise-superimposed sound data is obtained using the recognition dictionary storing in advance the respective acoustic models of all phonetic symbols (e.g., Japanese syllabary) arranged in a parallel manner, the acoustic models being evaluated through endless loop until the end of uttering.

Subsequently, the generated acoustic model identifier series is output to the user terminal 50 which has transmitted the sound data.

Next, an operation according to the above-explained embodiment will be explained.

When, for example, the user utters "a Ri Ga To" corresponding to a character string "Thanks," to the sound input unit 2, the uttered speech is picked up by the sound input unit 2 and is subjected to a predetermined process so as to be converted into digital sound data. This digital sound data is inputted to the first speech recognition unit 3 via the operation controller 5 (step S3 in FIG. 2), the first speech recognition unit 3 performs speech recognition.

When recognition data composed of the character string "Thanks" and the acoustic model identifier series corresponding to "a Ri Ga To" is registered in the first recognition dictionary 3*b* of the first speech recognition unit 3, the character string "Thanks" is output to the display controller 8 as the speech recognition result, and is displayed on the display device 9.

Conversely, when no recognition data composed of the character string "Thanks" and the acoustic model identifier series corresponding to "a Ri Ga To" is registered in the first recognition dictionary 3*b* of the first speech recognition unit 3, the first speech recognition unit 3 outputs a recognition failure notification to the effect that no corresponding data is present to the operation controller 5.

Accordingly, the operation controller 5 reads sound data of "a Ri Ga To" stored in the temporal memory unit 6 when the sound data is inputted, and outputs the read sound data to the second server device 60 and also the first server device 70 (step S5 in FIG. 2).

When the second server device 60 takes the sound data as input, the second server device 60 performs a speech recognition process on the sound data and outputs the speech recognition result (e.g., the character string "Thanks" corresponding to the sound data "a Ri Ga To") to the user terminal 50 which has transmitted the sound data. The display controller 8 of the user terminal 50 outputs the inputted speech recognition result to the display device 9.

At this time, when the speech recognition result includes multiple candidates, the user gives an operation of selecting one candidate through the operation input unit 10. The selected candidate is output to the recognition data registration unit 7 via the display controller 8. When the recognition result includes the single candidate, the candidate is automatically output from the display controller 8 to the recognition data registration unit 7.

Conversely, when the first server device 70 takes the sound data as input, the first server device 70 performs a noise data superimposing process on the sound data "a Ri Ga To", and obtains time-series data of feature from the noise-superimposed sound data, and generates an acoustic model identifier series obtained using the same type of acoustic model as that of the first speech recognition processing unit 3*a*.

Next, this acoustic model identifier series is output to the user terminal 50 which has transmitted the sound data.

The recognition data registration unit 7 of the user terminal 50 associates the acoustic model identifier series corresponding to the sound data "a Ri Ga To" inputted from the first server device 70 with the character string "Thanks" inputted from the display controller 8 as the speech recognition result to generate recognition data to be registered, and registers the generated recognition data in the first recognition dictionary 3*b* of the first speech recognition unit 3.

Hence, when sound data that is uttered as "a Ri Ga To" is inputted next time through the sound input unit 2, since the recognition data corresponding to "Thanks" is registered in the first recognition dictionary 3*b*, the speech recognition result is obtainable through a speech recognition by the first speech recognition unit 3.

Accordingly, even in the case of a character string not registered in the first recognition dictionary 3*b*, since the character string for which the speech recognition result once obtained by utilizing the second server device 60 is automatically registered in the first recognition dictionary 3*b*, the speech recognition result is obtainable through a speech recognition by the first speech recognition unit 3 from the next time. Moreover, in this case, since the recognition data is automatically registered in the first recognition dictionary 3*b*, the user can register new vocabularies in the first recognition dictionary 3*b* merely by performing a speech recognition operation.

Furthermore, in this case, the second server device 60 can perform the speech recognition process through an arbitrary pattern matching method. That is, the second server device 60 does not have to be under the control of a system constructor.

The second server device 60 storing vocabularies that are not stored in the user terminal 50 enables the display controller 8 to display a larger number of options with respect to an uttering by the user, thereby to improve the usability. The second server device 60 does not need to be one server device, but multiple server devices may be disposed in a parallel manner. The use of the multiple server devices as the second server device 60 enables the display controller 8 to display a larger number of options.

Moreover, the recognition data added in the first recognition dictionary 3*b* is generated by the speech recognition result selected by the user from multiple candidates. Unnecessary word for a user is never added. This results in an improvement of a recognition rate.

Moreover, the recognition data newly registered in the first recognition dictionary 3*b* utilizes the acoustic model identifier series generated based on the uttered speech by the user. Thus, it is possible to improve the recognition rate by obtaining recognition data that reflects the uttered speech by the user in comparison with a scheme that utilizes the recognition data registered in advance.

The acoustic model identifier series generation apparatus (first server device) 70 may be loaded in the same casing as the first speech recognition device (user terminal) 50, or may be loaded in a server device that can communicate with the first speech recognition device (user terminal) 50.

By loading the acoustic model identifier series generation apparatus (first server device) 70 in a server device that can communicate with the first speech recognition device (user terminal) 50, when the first speech recognition device (user terminal) 50 is a user terminal, the accuracy of the speech recognition function of the user terminal can be easily improved without a large-scale change in the every user terminal.

In particular, when the user terminal 50 is a portable terminal like a mobile phone, although hardware that can be built therein is limited, but the usability can be further improved by communicating with the second server device 60 if necessary.

Moreover, in the above-explained embodiment, although the explanation was given of a case in which the second server device 60 performs a speech recognition when the speech recognition by the first speech recognition unit 3 is unsuccessful, the present invention is not limited to this case, and a configuration may be employed in which both first speech recognition unit 3 and second server device 60 start the speech recognition on the inputted sound data simultaneously.

According to this configuration, it becomes possible to address an inconvenience event that the start of the process by the second server device 60 is delayed by waiting the speech recognition by the first speech recognition unit 3.

Moreover, in the above-explained embodiment, although the explanation was given of a case in which only the acoustic model identifier series generated based on the noise-superimposed sound data is registered, an acoustic model identifier series generated from sound data not having undergone a noise superimposition may be registered in parallel, or multiple SN ratios may be set and the respective acoustic model identifier series corresponding to the SN ratios are registered in parallel. Such an SN ratio may be an average or the maximum value in the operating environment of the user terminal 50. A scheme of setting in advance the SN ratio or the property of noise based on a sound insulating property or the engine noise of an automobile owned by the user is also applicable.

Moreover, although the explanation was given of a case in which the noise data storing unit 27*a* is built in the server device 70, the present invention is not limited to this case.

For example, the noise data storing unit 27a may be present at the user terminal side (i.e., at a client side) or may be built in another server device.

REFERENCE SIGNS LIST 2 sound input unit
3 first speech recognition unit
3a first speech recognition processing unit
3b first recognition dictionary
5 operation controller
6 temporal memory unit
7 recognition data registration unit
8 display controller
9 display device
10 operation input unit
14 second speech recognition unit
14a second speech recognition processing unit
14b second recognition dictionary
27 acoustic model identifier series generation unit
27a noise data storing unit
50 user terminal (first speech recognition device)
60 second server device (second speech recognition device)
70 first server device (acoustic model identifier series generation apparatus)
100 speech recognition system
110 recognition dictionary registration system

The invention claimed is:

1. A speech recognition system comprising:
a first speech recognition device;
a second speech recognition device; and
an acoustic model identifier series generation apparatus, wherein
the first speech recognition device comprises:
a sound input unit configured to obtain sound and to output sound data of the obtained sound;
a first recognition dictionary configured to store recognition data formed of a combination of information on a character string, and a first acoustic model identifier series based on a first type of feature, the first acoustic model identifier series corresponding to the information on the character string;
a first speech recognition processing unit configured to extract the first type of feature from a piece of the sound data outputted by the sound input unit, and to perform a speech recognition process on the piece of sound data using the first type of feature and the first recognition dictionary;
a recognition data registration unit; and
a transmitter configured to transmit the sound data outputted by the sound input unit to the second speech recognition device and the acoustic model identifier series generation apparatus,
the second speech recognition device comprises:
a first receiver configured to receive the sound data transmitted from the first speech recognition device;
a second recognition dictionary configured to store recognition data formed of a combination of information on a character string, and a second acoustic model identifier series based on a second type of feature corresponding to the information on the character string, the second type of feature being different from the first type of feature; and
a second speech recognition processing unit configured to extract the second type of feature from the piece of the sound data transmitted from the first speech recognition device, and to perform a speech recognition process on the piece of sound data using the second type of feature and the second recognition dictionary, and to transmit information on a character string corresponding to the piece of sound data to the recognition data registration unit of the first speech recognition device,
the acoustic model identifier series generation apparatus comprises:
a second receiver configured to receive the sound data transmitted from the first speech recognition device; and
an acoustic model identifier series generation unit configured to extract the first type of feature from the piece of the sound data transmitted from the first speech recognition device, and to generate the first acoustic model identifier series based on the first type of feature corresponding to the piece of the sound data, and to transmit the first acoustic model identifier series to the recognition data registration unit of the first recognition device,
the recognition data registration unit of the first speech recognition device:
receives the first acoustic model identifier series generated by the acoustic model identifier series generation unit and the information on the character string corresponding to the piece of sound data generated by the second speech recognition device; and
forms a new recognition data of a combination of the received first acoustic model identifier series and the received information on the character string, and
registers the new recognition data in the first recognition dictionary,
wherein the second recognition dictionary is different from the first recognition dictionary in at least one of a system of an acoustic model identifier, a structure of parameters of an acoustic model, and the number of phonemes corresponding to one acoustic model,
wherein the acoustic model of the first speech recognition device and the acoustic model of the second recognition device are not compatible with each other such that the first speech recognition device and the second recognition device are configured to extract different features, respectively, from identical sound data.

2. The speech recognition system according to claim 1, further comprising a noise data storing unit configured to store noise data,
wherein the acoustic model identifier series generation unit extracts the first type of feature from second sound data obtained by superimposing the noise data on the piece of sound data, and generates the acoustic model identifier series based on the first type of feature from the extracted first type of feature, the acoustic model identifier series corresponding to the piece of sound data.

3. The speech recognition system according to claim 2, wherein the acoustic model identifier series generation unit superimposes the noise data on the piece of sound data such that a ratio of an energy of sound uttered by a human and an energy of noise contained in the second sound data becomes a preset ratio.

4. The speech recognition system according to claim 1, wherein when it is determined that the piece of sound data is unrecognizable through the speech recognition process by the first speech recognition processing unit, the second speech recognition processing unit performs the speech recognition process on the piece of sound data determined as unrecognizable by the first speech recognition processing unit.

5. The speech recognition system according to claim 1, wherein:
   the second speech recognition processing unit outputs a plurality of candidates for the information on the character string corresponding to the piece of sound data;
   the first speech recognition device comprises a selecting unit configured to select one candidate among the plurality of candidates for the information on the character string corresponding to the piece of sound data outputted by the second speech recognition processing unit; and
   the recognition data registration unit generates the recognition data to be stored in the first recognition dictionary, and registers the recognition data in the first recognition dictionary, the recognition data being formed of a combination of the acoustic model identifier series based on the first type of feature corresponding to the piece of sound data transmitted by the acoustic model identifier series generation unit, and the information on the character string corresponding to the piece of sound data transmitted from the second speech recognition unit and selected by the selecting unit.

6. The speech recognition system according to claim 1, wherein the acoustic model identifier series generation apparatus is loaded in a casing different from a casing of the first speech recognition device.

7. The speech recognition system according to claim 6, wherein the acoustic model identifier series generation apparatus is loaded in a server device capable of communicating with the first speech recognition device.

8. The speech recognition system according to claim 1, wherein the acoustic model identifier series generation apparatus is loaded in a same casing as the first speech recognition device.

9. The speech recognition system according to claim 1, wherein the first speech recognition processing unit is loaded in a terminal device, and the second speech recognition processing unit is loaded in a server device capable of communicating with the terminal device.

10. A recognition dictionary registration system comprising:
    a first speech recognition device; and
    an acoustic model identifier series generation apparatus, wherein
    the first speech recognition device comprises:
      a first recognition dictionary configured to store recognition data formed of a combination of information on a character string, and a first acoustic model identifier series based on a first type of feature, the first acoustic model identifier series corresponding to the information on the character string;
      a first speech recognition processing unit configured to obtain a piece of sound data outputted by a sound input unit that obtains sound and outputs the sound data of the obtained sound, and to extract the first type of feature from the piece of the sound data, and to perform a speech recognition process on the piece of sound data using the first type of feature and the first recognition dictionary;
      a recognition data registration unit; and
      a transmitter configured to transmit the sound data outputted by the sound input unit to the acoustic model identifier series generation apparatus and a second speech recognition device, the acoustic model identifier series generation apparatus comprises:
      a second receiver configured to receive the sound data transmitted from the first speech recognition device; and
      an acoustic model identifier series generation unit configured to extract the first type of feature from the piece of sound data, the sound data being transmitted from the first speech recognition device, and to generate, from the extracted first type of feature, acoustic model identifier series based on the first type of feature corresponding to the piece of sound data, and to transmit the first acoustic model identifier series to the recognition data registration unit of the first recognition device,
    the recognition data registration unit of the first speech recognition device forms a new recognition data of a combination of information on a character string corresponding to the piece of sound data generated by the second speech recognition device and the first acoustic model identifier series received from the acoustic model identifier series generation apparatus and registers the new recognition data in the first recognition dictionary, and
    the second speech recognition device comprises:
      a first receiver configured to receive the sound data transmitted from the first speech recognition device;
      a second recognition dictionary configured to store recognition data which is a combination of information on a character string and a second acoustic model identifier series based on a second type of feature corresponding to the information on the character string, the second acoustic model identifier series being different from the first type of feature; and
      a second speech recognition processing unit configured to extract the second type of feature from the piece of sound data, the sound data being transmitted from the first speech recognition device, and to perform a speech recognition process using the second type of feature and the second recognition dictionary, and to transmit the information on the character string corresponding to the piece of sound data to the recognition data registration unit of the first speech recognition device,
    wherein the second recognition dictionary is different from the first recognition dictionary in at least one of a system of an acoustic model identifier, a structure of parameters of an acoustic model, and the number of phonemes corresponding to one acoustic model,
    wherein the acoustic model of the first speech recognition device and the acoustic model of the second recognition device are not compatible with each other such that the first speech recognition device and the second recognition device are configured to extract different features, respectively, from identical data.

11. An acoustic model identifier series generation apparatus comprising:
    an acoustic model identifier series generation unit configured to extract a first type of feature from sound data outputted by a sound input unit that obtains a sound, and to generate a first acoustic model identifier series based on the first type of feature, the first acoustic model identifier series corresponding to the sound data, and to transmit the acoustic model identifier series, wherein the acoustic model identifier series generation unit transmits the first acoustic model identifier series to a recognition data registration unit of a first speech recognition device, the first speech recognition device comprises:

a first recognition dictionary configured to store recognition data which is formed of a combination of information on a character string and the first acoustic model identifier series based on the first type of feature, the first acoustic model identifier series corresponding to the information on the character string;

a first speech recognition processing unit configured to extract the first type of feature from the sound data, and to perform a speech recognition process on the sound data using the first type of feature and the first recognition dictionary;

the recognition data registration unit; and a transmitter configured to transmit the sound data outputted by the sound input unit to the acoustic model identifier series generation apparatus and a second speech recognition device, the recognition data registration unit forms a new recognition data of a combination of information on a character string corresponding to the sound data generated by the second speech recognition device and the first acoustic model identifier series based on the first type of feature corresponding to the sound data received from the acoustic model identifier series generation apparatus and registers the new recognition data in the first recognition dictionary, and the second speech recognition device comprises:

a receiver configured to receive the sound data transmitted from the first speech recognition device;

a second recognition dictionary configured to store recognition data which is formed of a combination of information on a character string and a second acoustic model identifier series based on a second type of feature corresponding to the information on the character string the second acoustic model identifier series being different from the first type of feature; and a second speech recognition processing unit configured to extract the second type of feature from the sound data, the sound data being transmitted from the first speech recognition device, and to perform a speech recognition process using the second type of feature and the second recognition dictionary, and to transmit the information on the character string corresponding to the sound data to an outside apparatus, wherein the second recognition dictionary is different from the first recognition dictionary in at least one of a system of an acoustic model identifier, a structure of parameters of an acoustic model, and the number of phonemes corresponding to one acoustic model, wherein the acoustic model of the first speech recognition device and the acoustic model of the second recognition device are not compatible with each other such that the first speech recognition device and the second recognition device are configured to extract different features, respectively, from identical sound data.

* * * * *